(12) United States Patent
Harada

(10) Patent No.: US 11,011,307 B2
(45) Date of Patent: May 18, 2021

(54) ELECTRONIC COMPONENT

(71) Applicant: Murata Manufacturing Co., Ltd., Nagaokakyo (JP)

(72) Inventor: Toshihiro Harada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 96 days.

(21) Appl. No.: 16/401,506

(22) Filed: May 2, 2019

(65) Prior Publication Data

US 2019/0392991 A1 Dec. 26, 2019

(30) Foreign Application Priority Data

Jun. 21, 2018 (JP) .............................. JP2018-117648

(51) Int. Cl.
| | |
|---|---|
| *H01G 4/228* | (2006.01) |
| *H01G 4/12* | (2006.01) |
| *H01G 2/06* | (2006.01) |
| *H01G 4/30* | (2006.01) |

(52) U.S. Cl.
CPC ............... *H01G 4/12* (2013.01); *H01G 2/065* (2013.01); *H01G 4/228* (2013.01); *H01G 4/30* (2013.01)

(58) Field of Classification Search
None
See application file for complete search history.

(56) References Cited

U.S. PATENT DOCUMENTS

| 10,008,331 B2* | 6/2018 | Ikeda | H01G 4/2325 |
|---|---|---|---|
| 10,262,799 B2* | 4/2019 | Sugita | H01G 4/2325 |
| 2012/0188682 A1* | 7/2012 | Sato | H01G 4/232 361/305 |
| 2016/0293331 A1* | 10/2016 | Kitamura | H01G 4/12 |
| 2016/0379758 A1* | 12/2016 | Otani | H01G 4/005 361/301.4 |
| 2017/0103853 A1* | 4/2017 | Zenzai | H01G 4/005 |
| 2017/0301468 A1* | 10/2017 | Kim | H01G 4/232 |
| 2018/0114644 A1* | 4/2018 | Sugita | H01G 4/12 |
| 2018/0151296 A1* | 5/2018 | Yamada | H01G 4/232 |
| 2018/0233289 A1* | 8/2018 | Nagai | H01G 4/2325 |

FOREIGN PATENT DOCUMENTS

JP 2000-182883 A 6/2000

* cited by examiner

*Primary Examiner* — Dion Ferguson
(74) *Attorney, Agent, or Firm* — Keating & Bennett, LLP

(57) ABSTRACT

An electronic component includes a laminate and an external electrode provided on an end surface of the laminate. The external electrode includes a Ni layer provided on the end surface, a Ni—Sn alloy layer provided on the Ni layer, and a resin layer that is provided on the Ni—Sn alloy layer and includes metal grains including Sn grains. The Ni layer and the Ni—Sn alloy layer reduce or prevent intrusion of moisture from the external electrode into an interior of the laminate, and the resin layer reduces or prevents generation of cracks when a bending stress is applied to the external electrode.

14 Claims, 3 Drawing Sheets

ELECTRONIC COMPONENT

CROSS REFERENCE TO RELATED APPLICATIONS

This application claims the benefit of priority to Japanese Patent Application No. 2018-117648 filed on Jun. 21, 2018. The entire contents of this application are hereby incorporated herein by reference.

BACKGROUND OF THE INVENTION

1. Field of the Invention

The present invention relates to an electronic component including an external electrode on a surface of a laminate, and a method of producing the electronic component.

2. Description of the Related Art

An electronic component including an external electrode on a surface of a laminate, such as a multilayer ceramic capacitor, is known. When a bending stress due to deflection or the like is applied to a substrate in a state in which the electronic component is mounted on the substrate, cracks may be generated in the external electrode. In that case, moisture intrudes from the portion at which the cracks are generated, the insulation resistance value decreases, and an internal electrode provided inside the laminate may short-circuit.

Japanese Patent Application Laid-Open No. 2000-182883 describes an electronic component in which resistance to a bending stress is improved by forming an external electrode using a resin including metal grains.

However, since the resin tends to be permeated with moisture, when an external electrode is formed using the resin, moisture intrudes into the inside from the external electrode. Thus, the insulation resistance value may be reduced.

SUMMARY OF THE INVENTION

Preferred embodiments of the present invention provide electronic components each of which is less susceptible to cracking even when a bending stress is applied to the external electrode and which reduce or prevent the intrusion of moisture, and methods of producing the external electrodes.

An electronic component according to a preferred embodiment of the present invention includes a laminate; and an external electrode provided on an end surface of the laminate; wherein the external electrode includes a Ni layer provided on the end surface, a Ni—Sn alloy layer provided on the Ni layer, and a resin layer provided on the Ni—Sn alloy layer and including metal grains including Sn grains.

In an electronic component according to a preferred embodiment of the present invention, the metal grains may include at least one of Ag grains, Cu grains, and Ni grains, in addition to the Sn grains.

In an electronic component according to a preferred embodiment of the present invention, the laminate includes an internal electrode including Ni, the internal electrode is extended to the end surface on which the external electrode is provided and connected to the external electrode, and the Ni layer and the internal electrode may be sintered.

In an electronic component according to a preferred embodiment of the present invention, the metal grains may have at least one of a flat shape and a spherical shape.

A method of producing an electronic component according to a preferred embodiment of the present invention is a method of producing an electronic component including a laminate in which a plurality of dielectric layers and a plurality of internal electrodes are alternately laminated and the internal electrodes are extended to both end surfaces, the method includes providing an unfired laminate that becomes the laminate after being fired; applying a Ni-containing conductive paste to both of the end surfaces of the unfired laminate; integrally firing the Ni-containing conductive paste and the unfired laminate to form the laminate having a Ni layer formed on an end surface; applying a resin paste including metal grains including Sn grains on the Ni layer; and heat-treating the laminate coated with the resin paste to form a Ni—Sn alloy layer on the Ni layer, and forming a resin layer including the metal grains on the Ni—Sn alloy layer.

In a method of producing an electronic component according to a preferred embodiment of the present invention, a temperature for the heat treatment may be about 400° C. or more and about 600° C. or less.

The electronic components according to preferred embodiments of the present invention are each configured such that the external electrode includes a Ni layer provided on the end surface of the laminate, a Ni—Sn alloy layer provided on the Ni layer, and a resin layer provided on the Ni—Sn alloy layer and includes metal grains including Sn grains. The Ni layer and the Ni—Sn alloy layer are provided to reduce or prevent the intrusion of moisture from the external electrode into the inside of the laminate, and the resin layer is provided to reduce or prevent generation of cracks when a bending stress is applied to the external electrode.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, the features of preferred embodiments of the present invention will be described in detail with reference to the accompanying drawings.

In the following description, the multilayer ceramic capacitor will be described as an example of the electronic component. However, the electronic component of the present invention is not limited to the multilayer ceramic capacitor.

Figure 1:
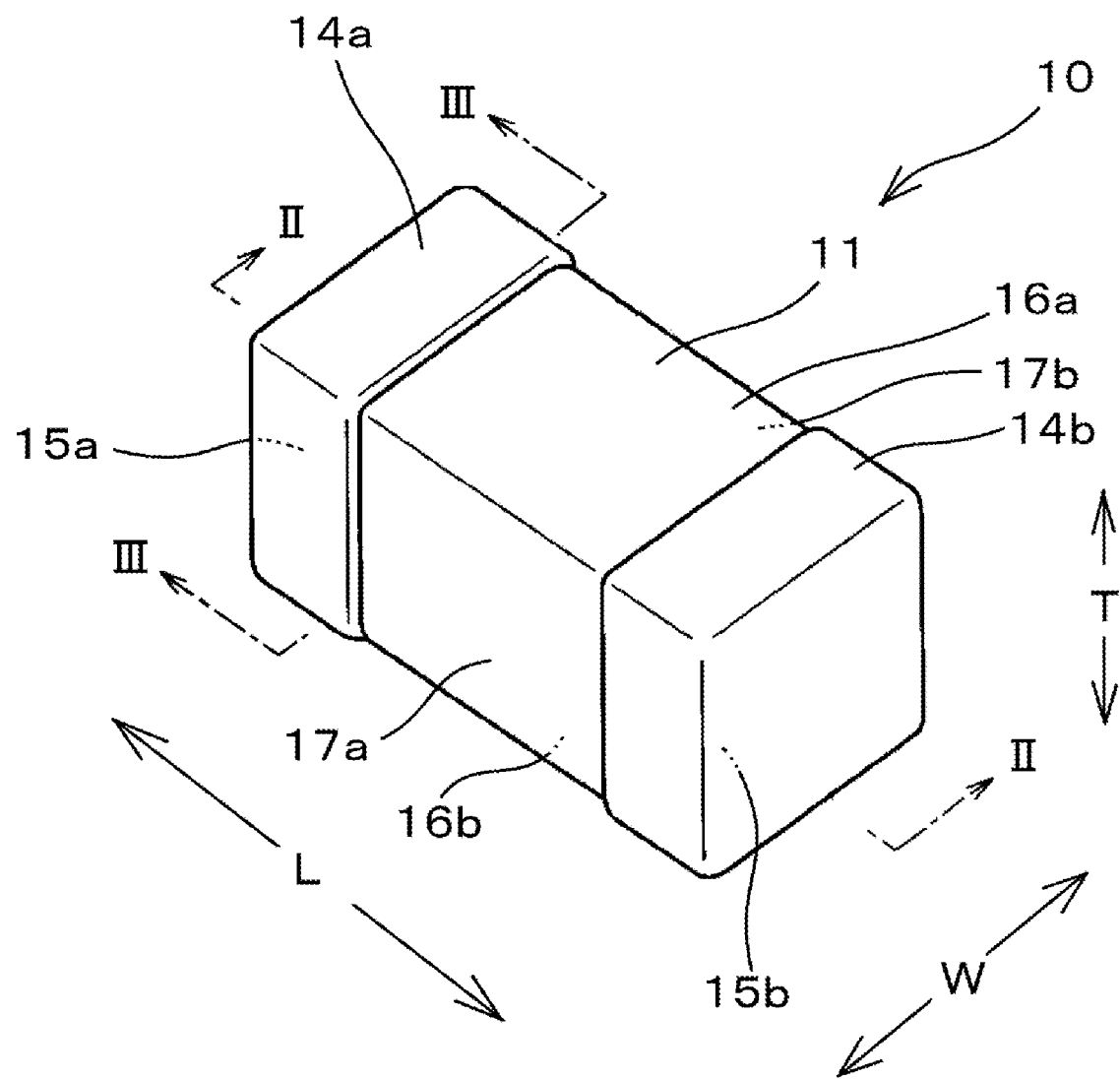
FIG. 1 is a perspective view of a multilayer ceramic capacitor according to a preferred embodiment of the present invention.
Figure 2:
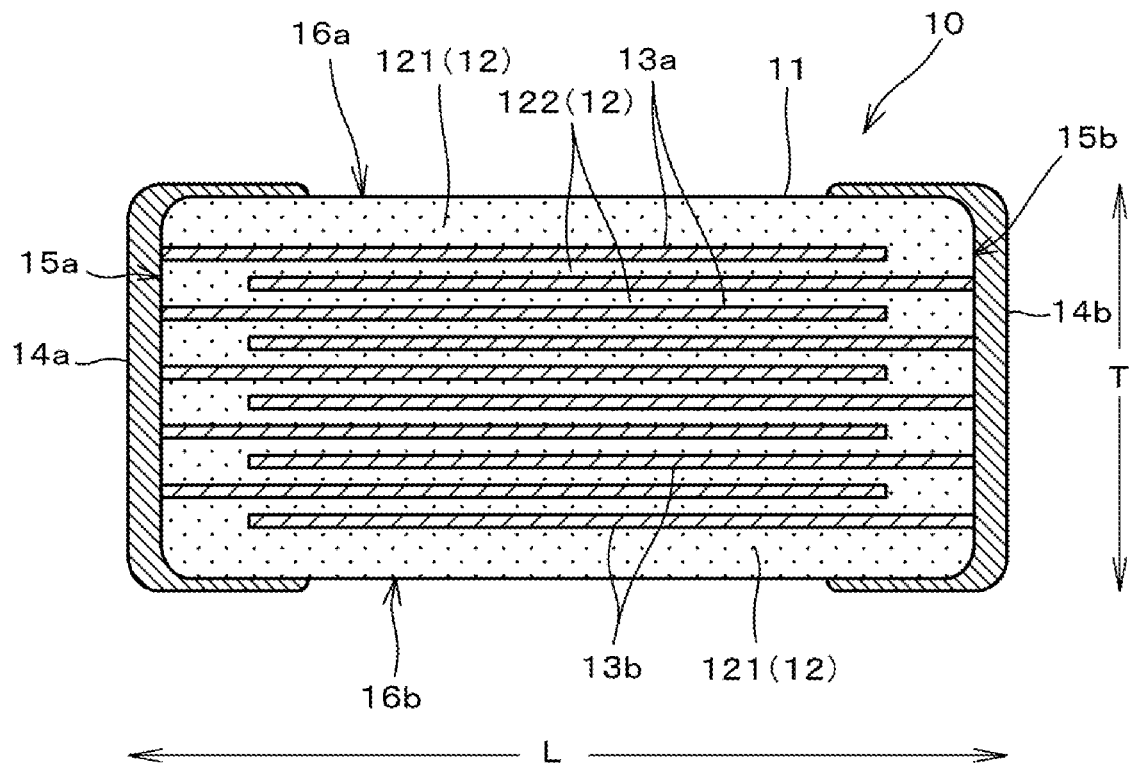
FIG. 2 is a cross-sectional view taken along a line II-II of the multilayer ceramic capacitor illustrated in FIG. 1.
Figure 3:
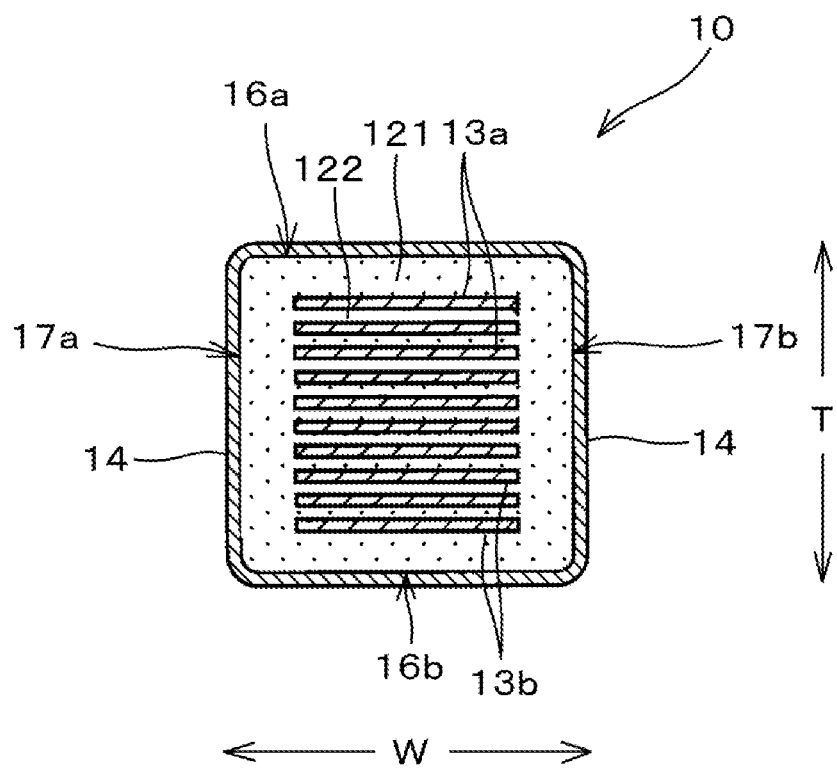
FIG. 3 is a cross-sectional view taken along a line of the multilayer ceramic capacitor illustrated in FIG. 1.

FIG. 1 is a perspective view of a multilayer ceramic capacitor 10 according to a preferred embodiment of the present invention. FIG. 2 is a cross-sectional view taken along the line II-II of the multilayer ceramic capacitor 10 illustrated in FIG. 1. FIG. 3 is a cross-sectional view of the multilayer ceramic capacitor 10 illustrated in FIG. 1 taken along the line III-III.

As illustrated in FIGS. 1 to 3, the multilayer ceramic capacitor 10 preferably has a rectangular or substantially rectangular parallelepiped shape, and includes a laminate 11 and a pair of external electrodes 14 (14a and 14b). The pair of external electrodes 14 (14a and 14b) are opposed to each other as illustrated in FIG. 1.

Here, the direction in which the pair of external electrodes 14 are opposed to each other is defined as a length direction L of the multilayer ceramic capacitor 10, the laminating direction of internal electrodes 13 (13a an 13b) to be described later is defined as a thickness direction T, and a direction orthogonal or substantially orthogonal to both the length direction L and the thickness direction T is defined as a width direction W.

The laminate 11 includes a first end surface 15a and a second end surface 15b opposed to each other in the length direction L, a first main surface 16a and a second main surface 16b opposed to each other in the thickness direction T, and a first side surface 17a and a second side surface 17b opposed to each other in the width direction W.

A first external electrode 14a is provided on the first end surface 15a, and a second external electrode 14b is provided on the second end surface 15b. Detailed configurations of the first external electrode 14a and the second external electrode 14b will be described later.

A dimension in the length direction L of the laminate 11 is preferably, for example, about 0.4 mm or more and about 3.2 mm or less, a dimension in the width direction W is preferably, for example, about 0.2 mm or more and about 2.5 mm or less, and a dimension in the thickness direction T is preferably, for example, about 0.2 mm or more and about 2.5 mm or less. The dimension in the length direction L may be longer or shorter than the dimension in the width direction W. The dimensions of the laminate 11 may be measured with a micrometer or an optical microscope.

Preferably, the laminate 11 includes rounded corners and rounded ridges. Here, each of the corners is a portion at which three surfaces of the laminate 11 intersect with one another, and each of the ridges is a portion at which two surfaces of the laminate 11 intersect with each other.

As illustrated in FIGS. 2 and 3, the laminate 11 includes dielectric layers 12, first internal electrodes 13a, and second internal electrodes 13b.

The dielectric layers 12 include outer dielectric layers 121 positioned outside in the thickness direction of the laminate 11 and inner dielectric layers 122 positioned between the first internal electrodes 13a and the second internal electrodes 13b. Each of the outer dielectric layers 121 preferably has a thickness of, for example, about 20 µm or more. Further, each of the inner dielectric layers 122 preferably has a thickness of, for example, about 0.5 µm or more and about 2.0 µm or less.

The first internal electrodes 13a are extended to the first end surface 15a of the laminate 11. The second internal electrodes 13b are extended to the second end surface 15b of the laminate 11. The first internal electrodes 13a and the second internal electrodes 13b are alternately disposed in the thickness direction T with the inner dielectric layers 122 interposed therebetween.

The first internal electrode 13a includes an opposed electrode portion opposite to the second internal electrode 13b and an extended electrode portion extended from the opposed electrode portion to the first end surface 15a of the laminate 11. The second internal electrode 13b includes an opposed electrode portion opposite to the first internal electrode 13a and an extended electrode portion extended from the opposed electrode portion to the second end surface 15b of the laminate 11.

The opposed electrode portion of the first internal electrode 13a is opposite to the opposed electrode portion of the second internal electrode 13b with the inner dielectric layer 122 interposed therebetween, thus generating capacitance and defining and functioning as a capacitor.

The first internal electrode 13a and the second internal electrode 13b preferably include, for example, a metal such as Ni, Cu, Ag, Pd or Au, or an alloy of Ag and Pd. More preferably, the first internal electrode 13a and the second internal electrode 13b include Ni. The first internal electrode 13a and the second internal electrode 13b may further include dielectric grains having the same or substantially the same composition system as the ceramic included in the dielectric layer 12.

It is preferable that the thicknesses of the first internal electrode 13a and the second internal electrode 13b are about 0.5 µm or more and about 2.0 µm or less, for example.

The first external electrode 14a is provided on the entirety or substantially the entirety of the first end surface 15a of the laminate 11, and extends from the first end surface 15a, to the first main surface 16a, the second main surface 16b, the first side surface 17a, and the second side surface 17b. The first external electrode 14a is electrically connected to the first internal electrode 13a.

The second external electrode 14b is provided on the entirety or substantially the entirety of the second end surface 15b of the laminate 11, and extends from the second end surface 15b, to the first main surface 16a, the second main surface 16b, the first side surface 17a, and the second side surface 17b. The second external electrode 14b is electrically connected to the second internal electrode 13b.

Figure 4:
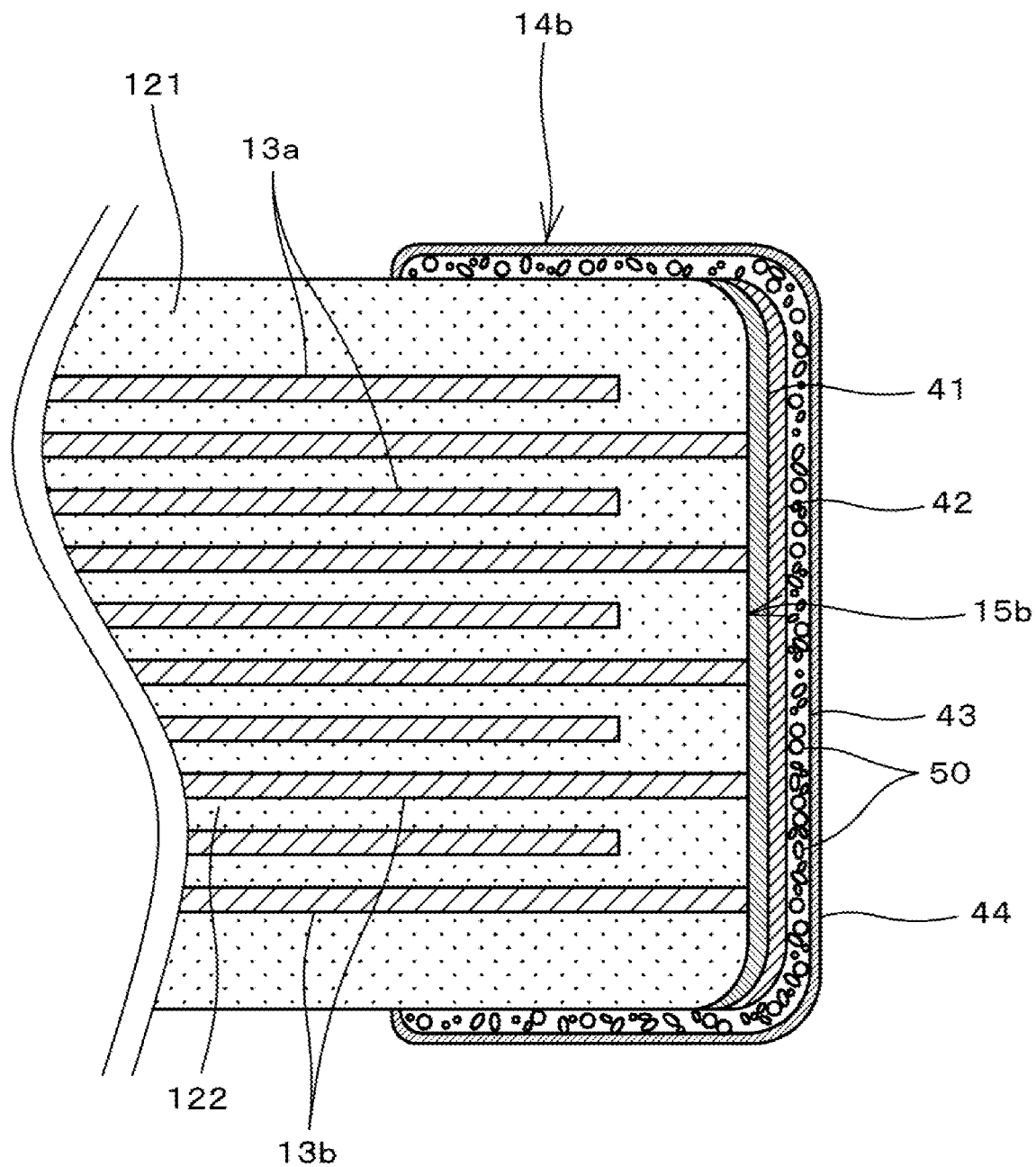
FIG. 4 is a cross-sectional view illustrating a detailed configuration of a second external electrode.

FIG. 4 is a cross-sectional view illustrating a detailed configuration of the second external electrode 14b. Hereinafter, the configuration of the second external electrode 14b will be described, and the same holds true for the configuration of the first external electrode 14a.

The second external electrode 14b includes a Ni layer 41, a Ni—Sn alloy layer 42, a resin layer 43, and a plating layer 44.

The Ni layer 41 made of Ni is provided on the second end surface 15b of the laminate 11. In the present preferred embodiment, the Ni layer 41 is provided only on the second end surface 15b so as not to extend to the first main surface 16a, the second main surface 16b, the first side surface 17a, and the second side surface 17b.

Preferably, the thickness of the Ni layer 41 is, for example, about 2 µm or more and about 10 µm or less. When the thickness of the Ni layer 41 is less than about 2 µm, the effect of reducing or preventing intrusion of moisture from the outside into the inside is reduced. Meanwhile, when the thickness of the Ni layer 41 exceeds about 10 µm, the thickness of the external electrode increases and the size of the multilayer ceramic capacitor 10 increases.

The Ni layer 41 is sintered integrally with the second internal electrode 13b. Although not illustrated, the Ni layer provided on the side of the first external electrode 14a is sintered integrally with the first internal electrode 13a. The Ni layer 41 is sintered integrally with the second internal electrode 13b and, thus, the adhesion between the Ni layer 41 and the second internal electrode 13b is increased, thus reducing or preventing the generation of a fragile site at the interface between the laminate 11 and the Ni layer 41.

The Ni—Sn alloy layer 42 is preferably made of an alloy of Ni and Sn, for example, and is provided on the Ni layer 41. In the present preferred embodiment, similarly to the Ni layer 41, the Ni—Sn alloy layer 42 does not extend to the first main surface 16a, the second main surface 16b, the first side surface 17a, and the second side surface 17b. Since the Ni—Sn alloy layer is provided on the Ni layer 41, the intrusion of moisture from the outside into the inside is able to be more effectively reduced or prevented, and a decrease in insulation resistance is able to be reduced or prevented.

The thickness of the Ni—Sn alloy layer 42 is preferably about 1 μm or more and about 5 μm or less, for example. When the thickness of the Ni—Sn alloy layer 42 is less than about 1 μm, the effect of reducing or preventing the intrusion of moisture from the outside into the inside is reduced. Further, when the thickness of the Ni—Sn alloy layer 42 exceeds about 5 μm, the thickness of the external electrode increases and the size of the multilayer ceramic capacitor 10 increases.

The resin layer 43 is provided on the Ni—Sn alloy layer 42 and preferably includes metal grains 50 including Sn grains, for example. The resin layer 43 is provided not only on the Ni—Sn alloy layer 42 but also extends to the first main surface 16a, the second main surface 16b, the first side surface 17a, and the second side surface 17b.

The metal grains 50 included in the resin layer 43 may be only Sn grains, or at least one of Ag grains, Cu grains, and Ni grains, in addition to the Sn grains. The metal grains 50 included in the resin layer 43 preferably include at least one of Ag grains, Cu grains, and Ni grains, for example, in addition to the Sn grains, so that it is possible to reduce the equivalent series resistance, compared with a configuration in which the metal grains 50 include only the Sn grains.

The metal grains 50 included in the resin layer 43 preferably have at least one of a flat shape and a spherical shape, for example. That is, the resin layer 43 may include only the flat metal grains 50, may include only the spherical metal grains 50, or may include both of the flat metal grains 50 and the spherical metal grains 50. The spherical shape includes not only a complete spherical shape but also a spherical or substantially spherical shape.

The flat metal grains 50 are included in the resin layer 43, so that the conductivity is improved. Further, the spherical metal grains 50 are included in the resin layer 43, so that it is possible to make the external electrode 14 less susceptible to cracking when a bending stress is applied to the multilayer ceramic capacitor 10. Therefore, it is preferable that the resin layer 43 includes the flat metal grains 50 and the spherical metal grains 50.

As the resin included in the resin layer 43, for example, a thermosetting resin, such as an epoxy resin, may be used.

For example, the thickness of the resin layer 43 is preferably about 20 μm or more and about 30 μm or less when the multilayer ceramic capacitor 10 has a 1005 size (the length direction L: about 1.0 mm, the width direction W: about 0.5 mm). The resin layer 43 extends to the first main surface 16a, the second main surface 16b, the first side surface 17a, and the second side surface 17b of the laminate 11.

The grain diameter of the metal grains 50 is preferably, for example, about 1 μm or more and about 10 μm or less. When the metal grains are not spherical, the grain diameter is a sphere equivalent diameter. The content rate of the metal grains in the resin layer 43 is preferably about 40% by volume or more, for example. The content rate of the metal grains is set to about 40% by volume or more so that it is possible to ensure good conductivity of the resin layer 43.

The plating layer 44 is provided on the resin layer 43. The plating layer 44 preferably includes, for example, at least one of Cu, Ni, Ag, Pd, an alloy of Ag and Pd, and Au.

The plating layer 44 may be a single layer or a plurality of layers. However, it is preferable that the plating layer 44 have a two-layer structure including a Ni plating layer and a Sn plating layer. The Ni plating layer prevents the resin layer 43 from being eroded by the solder when the multilayer ceramic capacitor 10 is mounted. The Sn plating layer also improves the wettability of the solder when the multilayer ceramic capacitor 10 is mounted.

Preferably, the thickness per layer of the plating layer 44 is, for example, about 2 μm or more and about 8 μm or less.

A non-limiting example of a method of producing a multilayer ceramic capacitor according to a preferred embodiment of the present invention will be described below.

First, a ceramic slurry is prepared by adding a binder and an organic solvent to a dielectric ceramic powder and dispersing the mixture, and the ceramic slurry is applied onto a resin film to produce a ceramic green sheet.

Then, a conductive paste for internal electrodes is provided, and an internal electrode pattern is formed by printing the conductive paste for internal electrodes on the ceramic green sheet. The conductive paste for internal electrodes includes, for example, a Ni powder, an organic solvent, and a binder. The conductive paste for internal electrodes may be printed by a printing method such as screen printing or gravure printing.

Subsequently, a predetermined number of ceramic green sheets with no internal electrode pattern formed thereon are stacked, a ceramic green sheet with internal electrode patterns formed thereon is sequentially stacked on the above stacked sheets. Further, a predetermined number of ceramic green sheets including no internal electrode pattern formed thereon are stacked on the resulting stacked sheets to produce a mother laminate.

Then, the mother laminate is pressed by a method such as rigid body pressing or isostatic pressing, for example.

After that, the pressed mother laminate is cut into a predetermined size by a cutting method, such as press-cutting, cutting with a dicing machine, or laser cutting, for example. Thereafter, the corners and ridges are rounded by barrel polishing, for example. An unfired laminate is obtained by the above-described step. In the unfired laminate, internal electrode patterns are exposed on both end surfaces.

Subsequently, the Ni-containing conductive paste is applied to a table to form a Ni-containing conductive paste layer. One end surface of the unfired laminate having the internal electrode patterns exposed on both end surfaces is immersed in the Ni-containing conductive paste layer, and one end surface is covered with the Ni-containing conductive paste. At this time, one end surface may be immersed in the Ni-containing conductive paste layer by holding the side surface of the unfired laminate using an elastic body, or alternately one end surface may be immersed in the Ni-containing conductive paste layer by adhering the other end surface of the unfired laminate to a holding member (not illustrated) with an adhesive interposed therebetween and holding the end surface. The Ni-containing conductive paste may include glass.

The thickness of the Ni-containing conductive paste layer formed on the table is preferably equal to or less than the R amount of the ridge of the unfired laminate. In a case in which the thickness of the Ni-containing conductive paste is equal to or less than the R amount of the ridge of the unfired laminate, when the end surface of the unfired laminate is immersed in the Ni-containing conductive paste layer, the Ni-containing conductive paste is able to be applied almost only to the end surface.

The Ni-containing conductive paste is also applied to the other end surface of the unfired laminate by the same method as described above.

The method of applying the Ni-containing conductive paste to the end surface of the unfired laminate is not limited to the above-described method, and other methods, such as screen printing, for example, may be used.

Subsequently, the organic solvent included in the Ni-containing conductive paste is removed by drying. For example, the Ni-containing conductive paste is dried in a high-temperature atmosphere of from about 80° C. to about 150° C. However, the drying method is not particularly limited, and for example, hot air may be blown or far infrared rays may be used for drying.

Subsequently, the unfired laminate coated with the Ni-containing conductive paste is fired, for example, at a temperature of about 1000° C. or more and about 1200° C. or less. In the present preferred embodiment, a fired laminate and a Ni layer are obtained by co-firing in which the unfired laminate and the Ni-containing conductive paste are simultaneously fired. The unfired laminate is integrally fired with the Ni-containing conductive paste, and thus, the adhesion between the laminate and the Ni layer obtained after firing is increased, so as to reduce or prevent the generation of a fragile site at the interface between the laminate and the Ni layer.

Further, since Ni powder is used as the metal powder included in the conductive paste for internal electrodes, the bonding force between the internal electrode and the Ni layer obtained after firing is able to be further increased.

Further, since the Ni-containing conductive paste is applied only to the end surface, when firing is performed, fastening due to shrinkage does not occur in the laminate in the process of forming the Ni layer. Consequently, it is possible to reduce or prevent the generation of cracks in the laminate due to shrinkage.

Furthermore, in the case of firing a large amount of unfired laminate at once to improve the productivity, when the Ni-containing conductive paste is applied to the side surface or the main surface, the unfired laminate may adhere to another unfired laminate through the Ni-containing conductive paste. However, in the present preferred embodiment, the Ni-containing conductive paste is not applied to the side surface and the main surface, such that it is possible to reduce or prevent the adhesion of the unfired laminate to another unfired laminate and to improve the productivity.

Subsequently, a resin paste obtained by mixing metal grains with an epoxy resin is applied to a table to form a resin paste layer. The metal grains include at least Sn grains. The thickness of the resin paste layer is preferably larger than the thickness of the Ni-containing conductive paste layer formed on the table.

Then, the Ni layer provided on the end surface of the laminate is immersed in the resin paste layer. The immersion in the resin paste layer may be performed by the same or substantially the same method as the immersion in the Ni-containing conductive paste layer.

After immersing the Ni layers provided on both end surfaces of the laminate in the resin paste layer, the resin paste is thermally solidified at a temperature of about 100° C. or more and about 200° C. or less, and further subjected to a heat treatment at a temperature of from about 400° C. to about 600° C., for example. Sn grains included in the resin paste react with Ni included in the Ni layer by the heat treatment, and a Ni—Sn alloy layer is formed on the sintered Ni layer. Further, a resin layer including metal grains is formed on the Ni—Sn alloy layer.

Subsequently, a plating layer is formed on the resin layer. For example, a Ni plating layer is formed on the resin layer, and a Sn plating layer is formed on the Ni plating layer. The plating layer may be formed by, for example, electrolytic plating.

Through the above-described steps, a multilayer ceramic capacitor including an external electrode is produced in which the Ni layer, the Ni—Sn alloy layer, the resin layer including the metal grains including the Sn grains, and the plating layer are formed on both end surfaces of the laminate in which the dielectric layers and the internal electrodes are alternately laminated.

The present invention is not limited to the above-described preferred embodiments, and various applications and modifications may be made within the scope of the present invention.

For example, in the preferred embodiments, the external electrode has been described as including the plating layer, but the external electrode may not include the plating layer.

The method of producing the multilayer ceramic capacitor 10 is not limited to the above-described example method. The above-described preferred embodiments have been explained such that, in order to form the external electrode, the resin paste including metal grains including Sn gains is applied onto the Ni layer, the heat treatment is performed, and the Ni—Sn alloy layer and the resin layer are simultaneously formed. However, the Ni layer, the Ni—Sn alloy layer, and the resin layer may be laminated and formed in this order.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
   a laminate; and
   an external electrode provided on an end surface of the laminate; wherein
   the external electrode includes:
   a Ni layer provided only on the end surface;
   a Ni—Sn alloy layer provided on the Ni layer only on the end surface; and
   a resin layer provided on the Ni—Sn alloy layer and including metal grains including Sn grains; and
   the resin layer extends from the end surface and onto at least one other surface of the laminate.

2. The electronic component according to claim 1, wherein the metal grains include at least one of Ag grains, Cu grains, and Ni grains, in addition to the Sn grains.

3. The electronic component according to claim 1, wherein the laminate includes an internal electrode including Ni;
   the internal electrode is extended to the end surface on which the external electrode is provided and connected to the external electrode; and
   the Ni layer and the internal electrode are sintered.

4. The electronic component according to claim 1, wherein the metal grains have at least one of a flat shape and a spherical shape.

5. The electronic component according to claim 1, wherein a dimension in a length direction of the laminate is about 0.4 mm or more and about 3.2 mm or less, a dimension in a width direction of the laminate is about 0.2 mm or more and about 2.5 mm or less, and a dimension in a thickness direction of the laminate is about 0.2 mm or more and about 2.5 mm or less.

6. The electronic component according to claim 1, wherein the laminate includes a plurality of dielectric layers and a plurality of internal electrodes that are alternately laminated.

7. The electronic component according to claim 6, wherein
the plurality of dielectric layers include inner dielectric layers and outer dielectric layers;
the inner dielectric layers are disposed inwardly of uppermost and lowermost internal electrodes of the plurality of internal electrodes; and
the outer dielectric layers are respectively disposed outwardly of the uppermost and lowermost internal electrodes.

8. The electronic component according to claim 7, wherein the inner dielectric layers have a thickness of about 0.5 μm or more and about 2.0 μm or less.

9. The electronic component according to claim 7, wherein the outer dielectric layers have a thickness of about 20 μm or more.

10. The electronic component according to claim 7, wherein the plurality of internal electrodes have a thickness of about 0.5 μm or more and about 2.0 μm or less.

11. The electronic component according to claim 1, wherein the external electrode includes a plating layer provided on the resin layer.

12. The electronic component according to claim 1, wherein the Ni layer has a thickness of about 2 μm or more and about 10 μm or less.

13. The electronic component according to claim 1, wherein the Ni—Sn alloy layer has a thickness of about 1 μm or more and about 5 μm or less.

14. The electronic component according to claim 11, wherein the plating layer includes a Ni plating layer and a Sn plating layer.

* * * * *